US012115745B2

(12) United States Patent
Verbruggen et al.

(10) Patent No.: US 12,115,745 B2
(45) Date of Patent: Oct. 15, 2024

(54) FESTOONER AND METHOD FOR BUFFERING A STRIP

(71) Applicant: VMI Holland B.V., Epe (NL)

(72) Inventors: Teunis Johannes Verbruggen, Epe (NL); Jochem Johannes Van Steenis, Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 18/275,194

(22) PCT Filed: Jan. 17, 2022

(86) PCT No.: PCT/NL2022/050013
§ 371 (c)(1),
(2) Date: Jul. 31, 2023

(87) PCT Pub. No.: WO2022/164310
PCT Pub. Date: Aug. 4, 2022

(65) Prior Publication Data
US 2024/0092599 A1    Mar. 21, 2024

(30) Foreign Application Priority Data

Jan. 29, 2021   (NL) ...................................... 2027462

(51) Int. Cl.
*B65H 20/34* (2006.01)
*B29D 30/00* (2006.01)
*B65H 23/188* (2006.01)

(52) U.S. Cl.
CPC ......... *B29D 30/0016* (2013.01); *B65H 20/34* (2013.01); *B29D 2030/0038* (2013.01); *B65H 2408/217* (2013.01)

(58) Field of Classification Search
CPC ........ B29D 30/0016; B29D 2030/0038; B65H 20/34; B65H 2408/217; B65H 2408/213; B56H 2408/2173
(Continued)

(56) References Cited

U.S. PATENT DOCUMENTS

| 4,009,814 A * | 3/1977 | Singh ..................... B65H 20/34 |
| | | 226/118.2 |
| 6,425,547 B1 | 7/2002 | Singh ........................... 242/527 |

(Continued)

FOREIGN PATENT DOCUMENTS

| CN | 101161448 | 4/2008 | ............. B29D 30/30 |
| CN | 205855525 | 1/2017 | ............. B65H 23/26 |

(Continued)

OTHER PUBLICATIONS

International Search Report and Written Opinion issued in PCT/NL2022/050013, dated May 2, 2022, 10 pages.

(Continued)

*Primary Examiner* — Michael McCullough
*Assistant Examiner* — Molly K Devine
(74) *Attorney, Agent, or Firm* — HAYES SOLOWAY P.C.

(57) ABSTRACT

Disclosed is a festooner and a method for buffering a strip, the festooner having a first set of buffer rollers and a second set of buffer rollers, wherein the first set of buffer rollers and the second set of buffer rollers define a meandering first buffer path between them, wherein the festooner further includes a first endless drive element for driving the first set of buffer rollers and the second set of buffer rollers. The festooner further includes a third set of buffer rollers and a fourth set of buffer rollers coaxial to the first set of buffer rollers and the second set of buffer rollers, respectively, defining a meandering second buffer path between them. The festooner further includes a second endless drive ele- (Continued)

ment for driving the third set of buffer rollers and the fourth set of buffer rollers.

29 Claims, 6 Drawing Sheets

(58) Field of Classification Search
USPC .......................................................... 226/104
See application file for complete search history.

(56) References Cited

U.S. PATENT DOCUMENTS

| | | | |
|---|---|---|---|
| 10,857,750 B2 | 12/2020 | Schouten et al. ...... | B29D 30/46 |
| 2002/0059013 A1 | 5/2002 | Rajala et al. .................. | 700/122 |
| 2006/0113348 A1 | 6/2006 | Nawata ........................... | 226/44 |
| 2013/0284786 A1* | 10/2013 | Fitts ....................... | B65H 20/34 |
| | | | 226/118.3 |
| 2020/0216281 A1 | 7/2020 | Raul et al. ......... | B65H 23/1888 |

FOREIGN PATENT DOCUMENTS

| | | | | |
|---|---|---|---|---|
| EP | 1595838 | | 11/2005 | ............. B65H 51/24 |
| EP | 3030411 B1 * | | 11/2018 | ............. B29D 30/30 |
| EP | 3030412 | | 11/2018 | ............. B29D 30/30 |
| EP | 3466855 | | 4/2019 | ............. B65H 20/34 |
| JP | 50134492 | | 11/1975 | ............. B65H 20/34 |
| JP | 6181016 | | 6/1994 | ............. H01B 13/00 |
| JP | 9118462 | | 5/1997 | ........... B65H 56/188 |
| JP | 2004210489 | | 7/2004 | ............. B65H 51/22 |
| JP | 2004210849 | | 7/2004 | ............. B65H 51/22 |
| JP | 2005506257 | | 3/2005 | ............. B65H 20/34 |
| JP | 2009184760 | | 8/2009 | ............. B29D 30/30 |
| JP | 2019059567 | | 4/2019 | ............. B65H 20/34 |
| KR | 20030042666 | | 6/2003 | ............. B29D 30/08 |
| KR | 1020190086456 | | 7/2019 | ............. B29D 30/46 |
| NL | 2001509 | | 1/2010 | ............. B65H 51/22 |
| WO | WO-2018182410 A1 * | | 10/2018 | ............. B65H 49/30 |
| WO | 2019243956 | | 12/2019 | ............. B65H 20/34 |

OTHER PUBLICATIONS

International Preliminary Report on Patentability issued in PCT/NL2022/050013, dated Jul. 31, 2023, 8 pages.
Notice of Reason for Refusal issued in Japanese Patent Appln. Serial No. 2002-529104, dated Aug. 8, 2023, with English translation, 4 pages.
International Search Report and Written Opinion issued in PCT/NL2022/050011, dated Sep. 5, 2022, 25 pages.
International Preliminary Report on Patentability issued in PCT/NL2022/050011, dated Jul. 31, 2023, 19 pages.
Decision to Grant issued in Japanese Patent Appln. Serial No. 2022-529104, dated Feb. 6, 2024, with machine English translation, 5 pages.
Decision to Grant issued in Japanese Patent Appln. Serial No. 2022-566096, dated Nov. 21, 2023, with machine English translation, 6 pages.
Decision to Grant issued in Korean Patent Appln. Serial No. 10-2023-7029233, dated Jul. 1, 2024, with machine English translation, 10 pages.

\* cited by examiner

FESTOONER AND METHOD FOR BUFFERING A STRIP

BACKGROUND

The invention relates to a festooner and a method for buffering a strip, in particular a strip used in tire building.

A festooner is used to temporarily store, accumulate or buffer a length of a strip between a continuous input and a discontinuous output. The festooner may for example be placed between an extruder for extruding a continuous strip and a cutter for cutting said continuous strip into cut-to-length components for a tire. The festooner comprises two groups of rollers that can move towards and away from each other to vary the buffering capacity of the festooner. The rollers passively rotate together with the strip as the strip is transported through the festooner.

The strip may deform as a result of the forces occurring in the festooner. In particular, when a relatively thin strip or an uncured strip is fed over the rollers, the inertia that has to be overcome to set the rollers in motion, however small, can cause tensile forces in the strip. To solve this problem, it is known to provide the strip with a liner of a relatively strong material that strengthens the strip along its path through the festooner. After the strip has left the festooner, the strip and the liner are separated and the liner is collected in a scrap bin.

KR 2003-0042666 A acknowledges that thin strips are sensitive to small factors causing deformation of the material. It proposes the use of a chain that drives the rollers at the correct speed so that tensile forces in the strip can be eliminated, thus preventing deformation in the strip as a result of external forces. It further discloses a twisted belt that is arranged in an endless loop along the path of the strip and that acts as a liner to prevent direct contact between the strip and the rollers.

The capacity of the festooner according to KR 2003-0042666 A is limited to the single buffer path formed by its endless loop. The capacity of said festooner can only be increased by increasing the length of the single buffer path and, thus, the overall footprint of the festooner.

NL 2001509 C2 discloses a festooner having at least two passively and freely rotatable rollers on each shaft and return rollers to form two subsequent buffer paths and return rollers for returning the strip from the first buffer path to the second buffer path. In this way, the capacity of the festooner can be doubled.

SUMMARY OF THE INVENTION

The increased length of the strip being buffered in the festooner according to NL 2001509 C2, means that the effect of friction and/or inertia between the buffer rollers and the strip on speed differences and tensile forces will be even stronger compared to the single buffer path in KR 2003-0042666 A.

It is an object of the present invention to provide a festooner and a method for buffering a strip, wherein the capacity of the festooner can be improved while mitigating the negative effects of friction and/or inertia.

According to a first aspect, the invention provides a festooner for buffering a strip, wherein the festooner comprises a first holder and a second holder, wherein at least one of the first holder and the second holder is movable towards and away from the other of the first holder and the second holder in a buffer direction to vary a buffer capacity of the festooner, wherein the festooner further comprises a first set of buffer rollers and a second set of buffer rollers held by the first holder and the second holder, respectively, wherein the first set of buffer rollers and the second set of buffer rollers define a meandering first buffer path between them extending alternatingly along a buffer roller of the first set of buffer rollers and a buffer roller of the second set of buffer rollers, wherein the festooner further comprises a first endless drive element for driving the first set of buffer rollers and the second set of buffer rollers, wherein the festooner further comprises a third set of buffer rollers and a fourth set of buffer rollers coaxial to the first set of buffer rollers and the second set of buffer rollers, respectively, defining a meandering second buffer path between them extending alternatingly along a buffer roller of the third set of buffer rollers and a buffer roller of the fourth set of buffer rollers, wherein the festooner further comprises a second endless drive element for driving the third set of buffer rollers and the fourth set of buffer rollers.

By guiding the strip along the first buffer path, then transferring the strip from the first buffer path to the second buffer path and then guiding the strip along the second buffer path, the capacity of the festooner can be increased significantly. The capacity may for example be doubled. One may even conceive having a third or further buffer paths to further increase the capacity of the festooner.

The negative effects of the increased capacity on friction and/or inertia can be mitigated by providing a first endless drive element for driving the buffer rollers associated with the first buffer path and a second endless drive element for driving the buffer rollers associated with the second buffer path. The first endless drive element and the second endless drive element can be made to extend or travel along the first buffer path and the second buffer path, respectively, and more or less behave in the same manner as the strip in each of the respective buffer paths. Hence, the speed with which each buffer roller is driven can be kept equal or substantially equal to the speed of the strip at the respective buffer roller. Consequently, the strip does not have to overcome the inertia of the buffer rollers and can be transported along the first buffer path and subsequently along the second buffer path of the festooner without excessive tensile forces being exerted onto the strip.

Thus, despite its increased capacity, the festooner according to the present invention is suitable for buffering a considerable length of a fragile or easily deformable strips, such as gum strips used in tire building, without exerting excessive tensile forces onto said strip.

Moreover, because of the reduced or virtually absent tensile forces, the strip can be buffered without the need for a liner supporting said strip.

Preferably, the festooner comprises a plurality of first shafts for mounting the first set of buffer rollers and the second set of buffer rollers, wherein the festooner further comprises a plurality of second shafts for mounting the third set of buffer rollers and the fourth set of buffer rollers, wherein the plurality of first shafts are hollow and wherein each second shaft of the plurality of second shafts extends concentrically through a respective first shaft of the plurality of first shafts. The third set of buffer rollers can thus be coaxially mounted with respect to the first set of buffer rollers. Similarly, the fourth set of buffer rollers can thus be coaxially mounted with respect to the second set of buffer rollers. Consequently, the second buffer path can at least partially be a copy of the first buffer path.

More preferably, the festooner comprises a first set of buffer wheels and a second set of buffer wheels which are coupled to the plurality of first shafts and the plurality of second shafts, respectively, wherein the first endless drive element is arranged for engaging onto the first set of buffer wheels and the second endless drive element is arranged for engaging onto the second set of buffer wheels. The buffer wheels can effectively convert the endless motion of the endless drive elements into a rotation of the respective shafts, thereby driving the respective buffer rollers.

Most preferably, the first holder and the second holder extend in a festooner plane parallel to the buffer direction, wherein the first set of buffer rollers, the second set of buffer rollers, the third set of buffer rollers and the fourth set of buffer rollers are located at a first side of the festooner plane, and wherein the first set of buffer wheels and the second set of buffer wheels are located at a second side of the festooner plane, opposite to the first side. The first shafts and the second shafts may thus extend from one side of the festooner plane, where the buffer rollers are located, through the respective holders to protrude from the other side of the festooner plane where the buffer wheels are located to effectively prevent interference between the driving mechanism for driving the buffer rollers and the buffering mechanism for buffering the strip.

In another embodiment the festooner comprises a first drive for driving one of the first endless drive element and the second endless drive element and a coupling member for coupling the first endless drive element to the second endless drive element. Hence, only one drive is required to drive both the first endless drive element and the second endless drive element.

Preferably, the coupling member comprises a third endless drive element. The third endless drive element can effectively transmit motion of the first endless drive element to the second endless drive element, i.e. with the use coaxially mounted coupling wheels.

In another embodiment the festooner further comprises a tension balancer for balancing tensioning between the first endless drive element and the second endless drive element. The tension balancer may cancel out and/or absorb tolerances in the endless drive elements, for example as a result of wear and/or elongation.

In an embodiment that combines the aforementioned tension balancer with the aforementioned buffer wheels, the tension balancer comprises one or more guides that are movable in a direction with at least a component in the buffer direction, wherein at least one buffer wheel of the first set of buffer wheels and/or the second set of buffer wheels is mounted to said one or more guides to move with said one or more guides in the buffer direction. Hence, tension can be generated and/or tolerances can be absorbed in said buffer direction.

In an embodiment that combines the aforementioned guide with the aforementioned coupling member, the coupling member is coupled to the one or more guides, wherein at least a part of the weight of the coupling member pulls down on the one or more guides in the buffer direction. Hence, the coupling member can perform both the function of interconnecting the endless drive elements and tensioning said endless drive elements. This way, one endless drive element can tension the other. Therefore the tension in one endless drive element can be kept the same or substantially the same as the tension in the other endless drive element, regardless of any elongation.

In another embodiment the festooner further comprises one or more dampeners for dampening the first endless drive element and/or the second endless drive element. Hence, minor vibrations and/or fluctuations in endless drive elements can be reduced and/or cancelled out.

In another embodiment the first holder and the second holder extend in a festooner plane parallel to the buffer direction, wherein the festooner further comprises a transfer member for transferring the strip from the first buffer path to the second buffer path along a transfer path extending obliquely to the festooner plane. The transfer member can thus effectively deflect and/or direct the strip from a plane containing the first buffer path towards a plane containing the second buffer path.

Additionally or alternatively, the transfer member comprises a set of transfer rollers for receiving the strip from the first buffer path and for outputting the strip into the second buffer path, wherein the set of transfer rollers are positioned obliquely with respect to the festooner plane. The strip may be twisted slightly in the transition from one of the buffer rollers associated with the first buffer path to one of said transfer rollers and/or in the transition from one of said transfer rollers to one of the buffer rollers associated with the second buffer path.

Additionally or alternatively, the festooner comprises a transfer conveyor extending obliquely to the festooner plane and/or parallel to the transfer path. The transfer conveyor can make contact with the strip at several locations along the transfer path, to ensure that the strip is effectively deflected and/or directed along the transfer path. The transfer conveyor may for example be a roller conveyor or a wire conveyor. Preferably, the transfer conveyor comprises an endless belt. Friction can be generated continuously between the endless belt and the strip to ensure that the strip is effectively deflected and/or directed along the transfer path.

In another embodiment the festooner comprises a second drive for driving the transfer conveyor. As it may be difficult to drive the transfer conveyor with the same endless drive elements as the buffer rollers, because of its oblique orientation relative to the festooner plane, a separate drive may be provided to control the speed of the transfer conveyor and/or the transfer rollers. The second drive may be electronically synchronized with the first drive to reduce or prevent speed differences.

In another embodiment the first buffer path and the second buffer path are parallel or substantially parallel. Hence, the buffer paths can be compactly stacked one in front of the other. Thus, buffer paths may be added to the first buffer path without significantly increasing the overall footprint of the festooner.

In another embodiment the first endless drive element and the second endless drive element are chains. The chains can be effectively engaged by sprocket wheels.

In another embodiment the first holder and the second holder are oppositely movable in the buffer direction to vary the buffer capacity of the festooner. With both holders being movable towards each other, a more ergonomic loading position can be obtained for manually loading the strip into the festooner.

In another embodiment the festooner further comprises an overlength collector for collecting and paying out overlengths of the first endless drive element and the second endless drive element as a result of a variation in the buffer capacity of the festooner. Hence, the lengths of the parts of the endless drive elements that extends along the first buffer path and the second buffer path can be kept the same as the length of the strip extending along said respective buffer paths, thereby ensuring that the respective endless drive elements behave in the same way as the strip, at least along said buffer paths.

Preferably, the overlength collector is located in the buffer direction at one side of the first buffer path only. A considerable part of the overlength of the drive element, and preferably all or the entire overlength of the drive element, can be collected at one end of the festooner only. In other words, there are no parts of the festooner responsible for the collection of the drive element at the other side of the first buffer path and/or the other end of the festooner. Consequently, more space of the festooner can be used to buffer the strip. Hence, the capacity of the festooner can be increased, Alternatively, the resulting festooner can be more compact while keeping the same capacity. More specifically, the festooner can be loaded more ergonomically because the distances between the oppositely moving holders and/or the loading positions of said holders can be improved.

Additionally or alternatively, the overlength collector is located in the buffer direction at a side of the first set of buffer rollers facing away from the second set of buffer rollers. Hence, the overlength collector does not interfere with the second set of buffer rollers and/or the second holder.

In a further embodiment thereof the first set of buffer rollers is located above the second set of buffer rollers, wherein the overlength collector is located above the first set of buffer rollers. With the overlength collector located overhead, the part of the festooner that buffers the strip can be located closer to the ground surface, i.e. within a range in which the festooner can be conveniently loaded by an operator.

In a further embodiment thereof the overlength collector comprises a first set of collector wheels and a second set of collector wheels that define a meandering first collector path between them extending alternatingly along a wheel of the first set of collector wheels and a wheel of the second set of collector wheels, wherein the first endless drive element extends along the first collector path. The first collector path can be used to temporarily collect and subsequently pay out the overlength of the first endless drive element in substantially the same way as the first buffer path is used to buffer the strip.

Preferably, the overlength collector comprises a third set of collector wheels and a fourth set of collector wheels that define a meandering second collector path between them extending alternatingly along a collector wheel of the third set of collector wheels and a collector wheel of the fourth set of collector wheels, wherein the second endless drive element extends along the second collector path. The second collector path can be used to temporarily collect and subsequently pay out the overlength of the second endless drive element in substantially the same way as the second buffer path is used to buffer the strip.

More preferably, the festooner comprises a plurality of third shafts for mounting the first set of collector wheels and the second set of collector wheels, wherein the festooner further comprises a plurality of fourth shafts for mounting the third set of collector wheels and the fourth set of collector wheels, wherein the plurality of third shafts are hollow and wherein each fourth shaft of the plurality of fourth shafts extends concentrically through a respective third shaft of the plurality of third shafts. The third set of collector wheels can thus be coaxially mounted with respect to the first set of collector wheels. Similarly, the fourth set of collector wheels can thus be coaxially mounted with respect to the second set of collector wheels. Consequently, the second collector path can at least partially be a copy of the first collector path.

Additionally or alternatively, the first collector path and the second collector path are parallel or substantially parallel. Hence, the collector paths can be compactly stacked one in front of the other. Thus, collector paths may be added to the first collector path without significantly increasing the overall footprint of the festooner.

According to a second aspect, the invention provides a method for buffering a strip using a festooner according to any one of the embodiments of the first aspect of the invention, wherein the method comprises the steps of:
  guiding a strip through the festooner along the first buffer path;
  transferring the strip from the first buffer path to the second buffer path;
  guiding the strip through the second buffer path;
  driving the first set of buffer rollers and the second set of buffer rollers with the first endless drive element; and
  driving the third set of buffer rollers and the fourth set of buffer rollers with the second endless drive element.

The method relates to the practical implementation of the festooner according to the first aspect of the invention and thus has the same technical advantages, which will not be repeated hereafter.

Preferably, the method further comprises the steps of:
  varying the buffer capacity of the festooner by moving at least one of the first holder and the second holder towards and/or away from the other of the first holder and the second holder. in the buffer direction; and
  collecting and/or paying out overlengths of the first endless drive element and the second endless drive element with an overlength collector in response to varying the buffer capacity.

Additionally or alternatively, the strip is guided through the festooner without using a support layer for supporting said strip relative to the buffer rollers. Without a liner, the buffering process can be less costly and/or more durable, because there is less waste.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
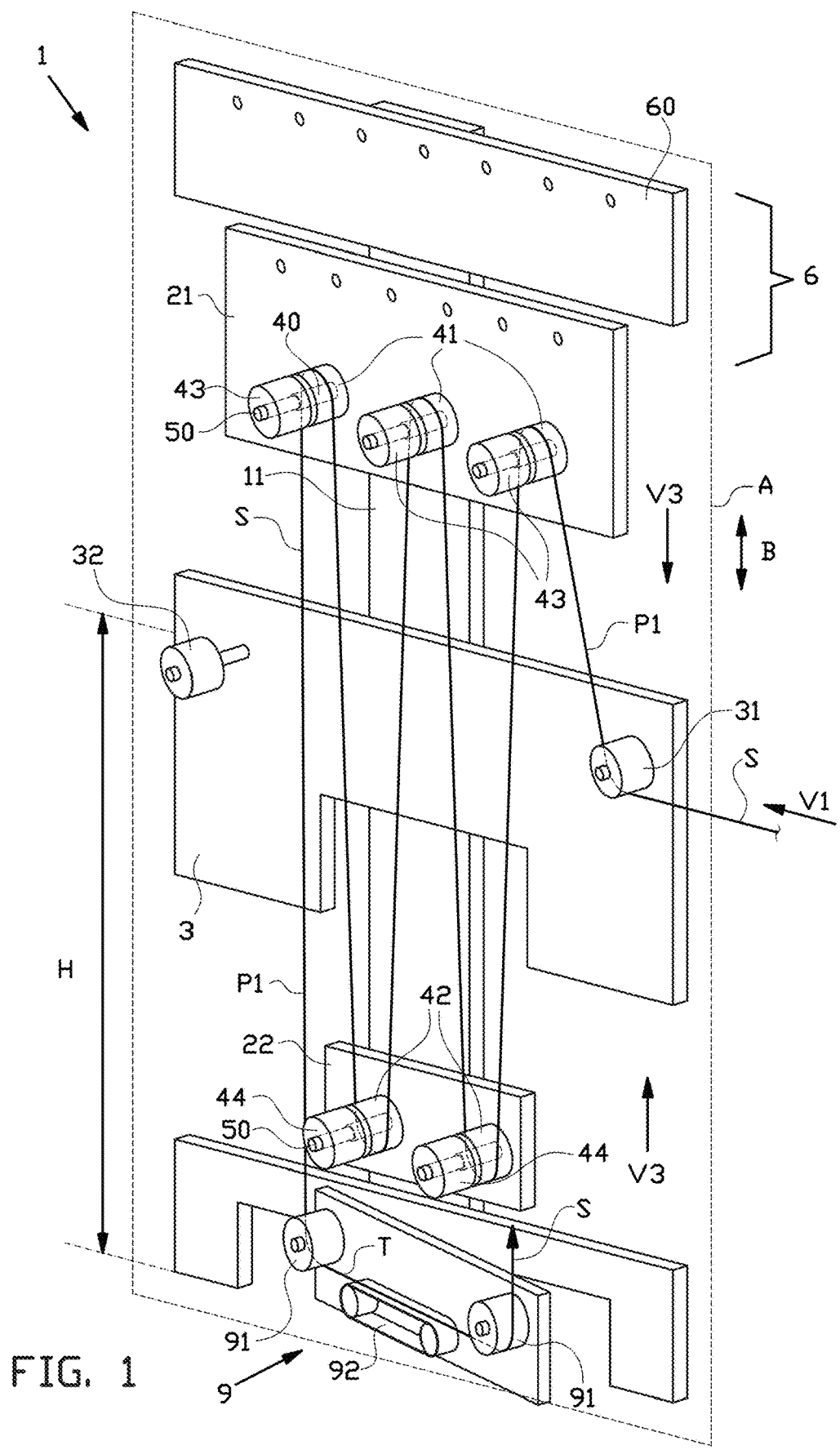
FIGS. 1 and 2 show isometric views of a front side of a festooner according to a first exemplary embodiment of the invention, at maximum capacity.

FIG. 1 shows a festooner 1 according to a first exemplary embodiment of the invention. The festooner 1 is used for temporarily accumulating or buffering the strip S between the continuous extrusion process of an extruder (not shown) and a discontinuous cutting or application process. The strip S can be used in tire building. In this example, the strip S is a gum strip that wrapped or folded around the sharp edges of a breaker ply to prevent that said sharp edges cut into other parts of the tire. Alternatively, the strip S can be used for foaming tire components through strip-winding.

As shown in FIG. 1, the festooner 1 comprises a base for placement of the festooner 1 on a ground surface, i.e. a factory floor, and a frame or a column 11 standing upright from said base. The festooner 1 further comprises a first holder 21 and a second holder 22 which are movable opposite to each other along the column 11, i.e. towards and away from each other, in a buffer direction B. The first holder 21 and the second holder 22 may comprise a bar-like body extending transverse or perpendicular to the buffer direction B. In this exemplary embodiment, the buffer direction B is parallel or substantially parallel to the column 11. Preferably, the buffer direction B is vertical or substantially vertical. The first holder 21 and the second holder 22 extend in a festooner plane A parallel to the buffer direction B.

The festooner 1 is provided with a first set of buffer rollers 41 and a second set of buffer rollers 42 held by or mounted to the first holder 21 and the second holder 22, respectively. Preferably, the buffer rollers of the first set of buffer rollers 41 are distributed over the first holder 21 at equal intervals. The first set of buffer rollers 41 and the second set of buffer rollers 42 define a first buffer path P1 between them that meanders, i.e. that travels or extends alternatingly a buffer roller of the first set of buffer rollers 41 and a buffer roller of the second set of buffer rollers 42. The first buffer path P1 coincides or substantially coincides with a first part of the path travelled by the strip S through the festooner 1. The first buffer path P1 extends in a first buffer plane parallel to the festooner plane A.

The festooner 1 further comprises a plurality of first shafts 40 for mounting the first set of buffer rollers 41 and the second set of buffer rollers 42 to the first holder 21 and the second holder 22, respectively. The first shafts 40 extend transverse or perpendicular to the festooner plane A. Each buffer roller of the first set of buffer rollers 41 and the second set of buffer rollers 42 is fixed to a respective one of the first shafts 40 so as to rotate together with said one first shaft 40. The first shafts 40 are hollow.

Figure 2:
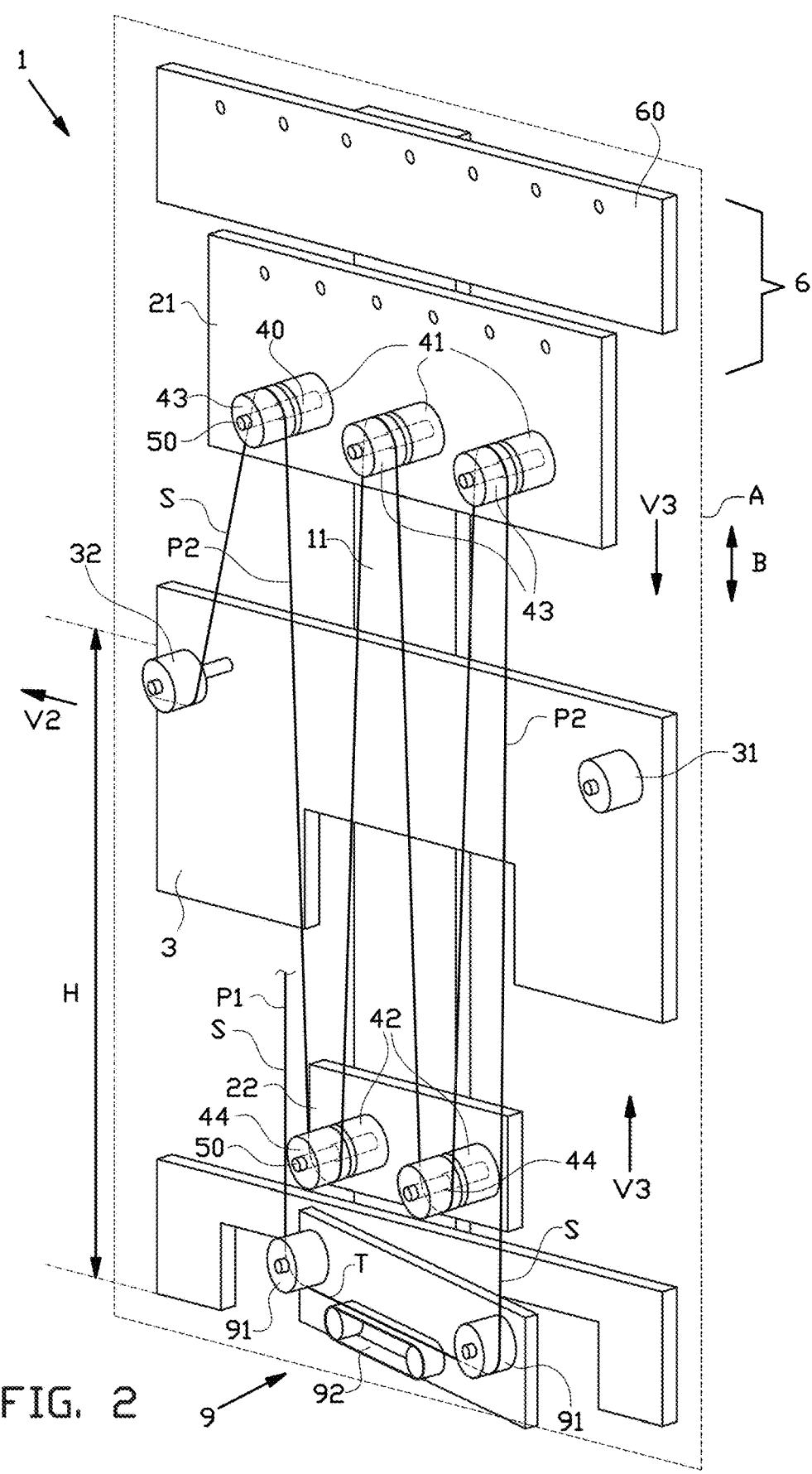

As shown in FIG. 2, the festooner 1 is further provided with a third set of buffer rollers 43 and a fourth set of buffer rollers 44 held by or mounted to the first holder 21 and the second holder 22, respectively, to define a second buffer path P2 between them that meanders, i.e. that travels or extends alternatingly a buffer roller of the third set of buffer rollers 43 and a buffer roller of the fourth set of buffer rollers 44. The second buffer path P2 coincides or substantially coincides with a second part of the path travelled by the strip S through the festooner 1. The second buffer path P2 extends in a second buffer plane parallel to the festooner plane A and spaced apart from the first buffer plane.

The festooner 1 further comprises a plurality of second shafts 50 for mounting the third set of buffer rollers 43 and the fourth set of buffer rollers 44. Each second shaft 50 of the plurality of second shafts 50 extends concentrically through a respective first shaft 40 of the plurality of first shafts 40. The second shafts 50 protrude from the first shafts 40 to support the third set of buffer rollers 43 and the fourth set of buffer rollers 44. Each buffer roller of the third set of buffer rollers 43 and the fourth set of buffer rollers 44 is fixed to the protruding part of a respective one of the second shafts 50 so as to rotate together with said one second shaft 50.

Consequently, the third set of buffer rollers 43 and a fourth set of buffer rollers 44 can be mounted or positioned coaxially with respect to the first set of buffer rollers 41 and the second set of buffer rollers 42, respectively. The second buffer path P2 can thus be a copy of the first buffer path P1, preferably extending parallel to each other in the first buffer plane and the second buffer plane, respectively.

The festooner 1 further comprises an intermediate member 3 for guiding the strip S into and out of the festooner 1, i.e. into the first buffer path P1 and out of the second buffer path P2. The intermediate member 3 may comprise a bar-like body extending transverse or perpendicular to the buffer direction B. The intermediate member 3 is positioned relative to the base such that the intermediate member 3 extends at a height H above the ground surface in a range of fifty centimeters to one-hundred-and-eighty centimeters, preferably one-hundred centimeters to one-hundred-and-eighty centimeters, more preferably one-hundred-and-twenty centimeters to one-hundred-and-sixty centimeters. Alternatively, a platform may be used for ergonomic access when the intermediate member 3 is positioned higher. The festooner 1 is provided with an entry roller 31 and an exit roller 32 held by the intermediate member 3 to guide the strip S into the first buffer path P1 and out of the second buffer path P2, respectively.

The transfer member 9 further comprises a transfer conveyor 92 extending obliquely to the festooner plane A, in particular parallel or substantially parallel to the transfer path T. In this exemplary embodiment, the transfer conveyor 92 comprises an endless belt.

The festooner 1 further comprises an intermediate member 3 for guiding the strip S into and out of the festooner 1, i.e. into the first buffer path P1 and out of the second buffer path P2. The intermediate member 3 may comprise a bar-like body extending transverse or perpendicular to the buffer direction B. The intermediate member 3 is positioned relative to the base 10 such that the intermediate member 3 extends at a height H above the ground surface in a range of fifty centimeters to one-hundred-and-eighty centimeters, preferably one-hundred centimeters to one-hundred-and-eighty centimeters, more preferably one-hundred-and-twenty centimeters to one-hundred-and-sixty centimeters. Alternatively, a platform may be used for ergonomic access when the intermediate member 3 is positioned higher. The festooner 1 is provided with an entry roller 31 and an exit roller 32 held by the intermediate member 3 to guide the strip S into the first buffer path P1 and out of the second buffer path P2, respectively.

FIGS. 1 and 2 show the first holder 21 and the second holder 22 in a first outer position and a second outer position, respectively, maximally spaced apart from the intermediate member 3 in the buffer direction B.

Figure 3:
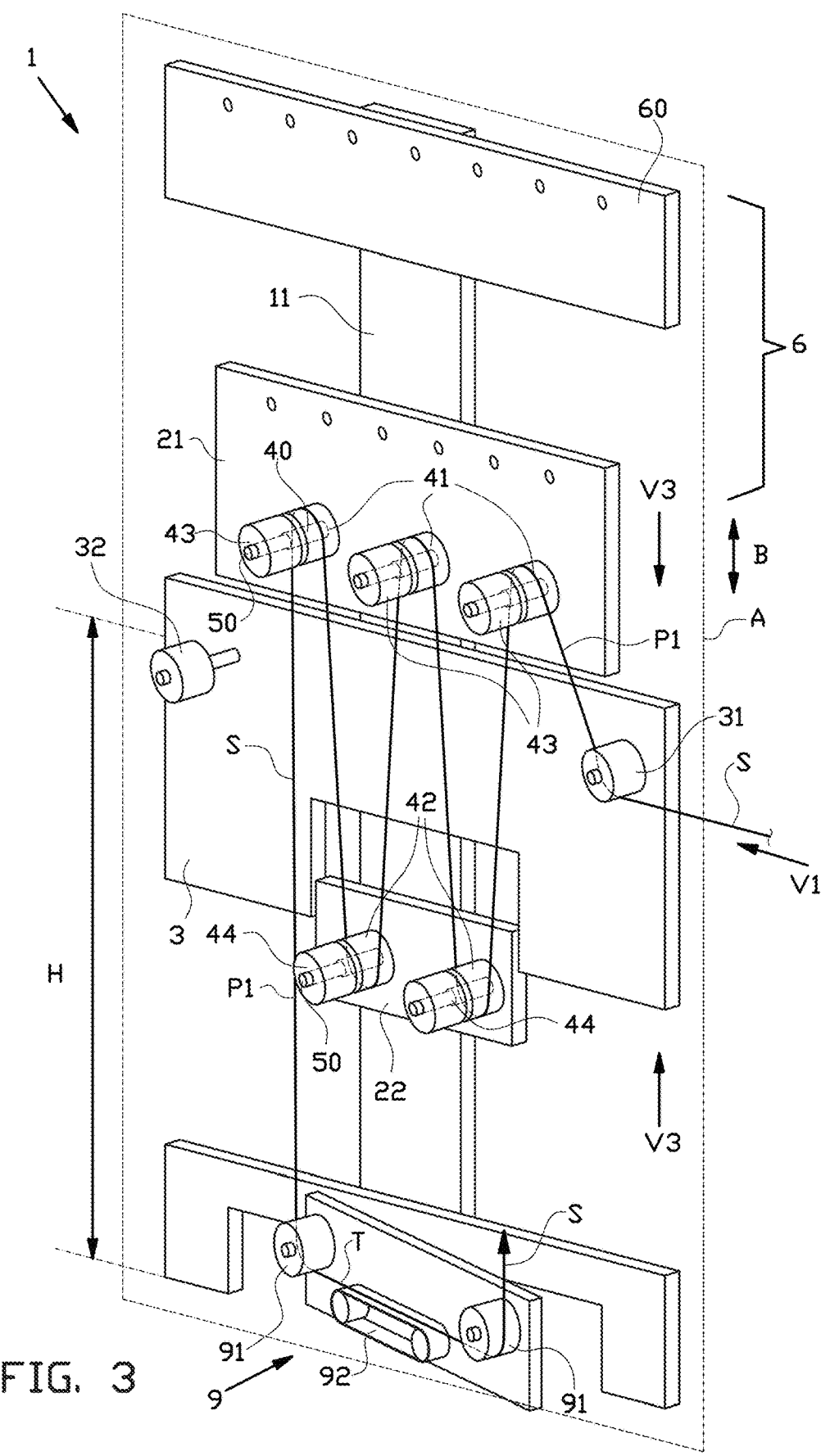
FIGS. 3 and 4 show isometric views of the front side of the festooner according to FIGS. 1 and 2, respectively, at minimum capacity.
Figure 4:
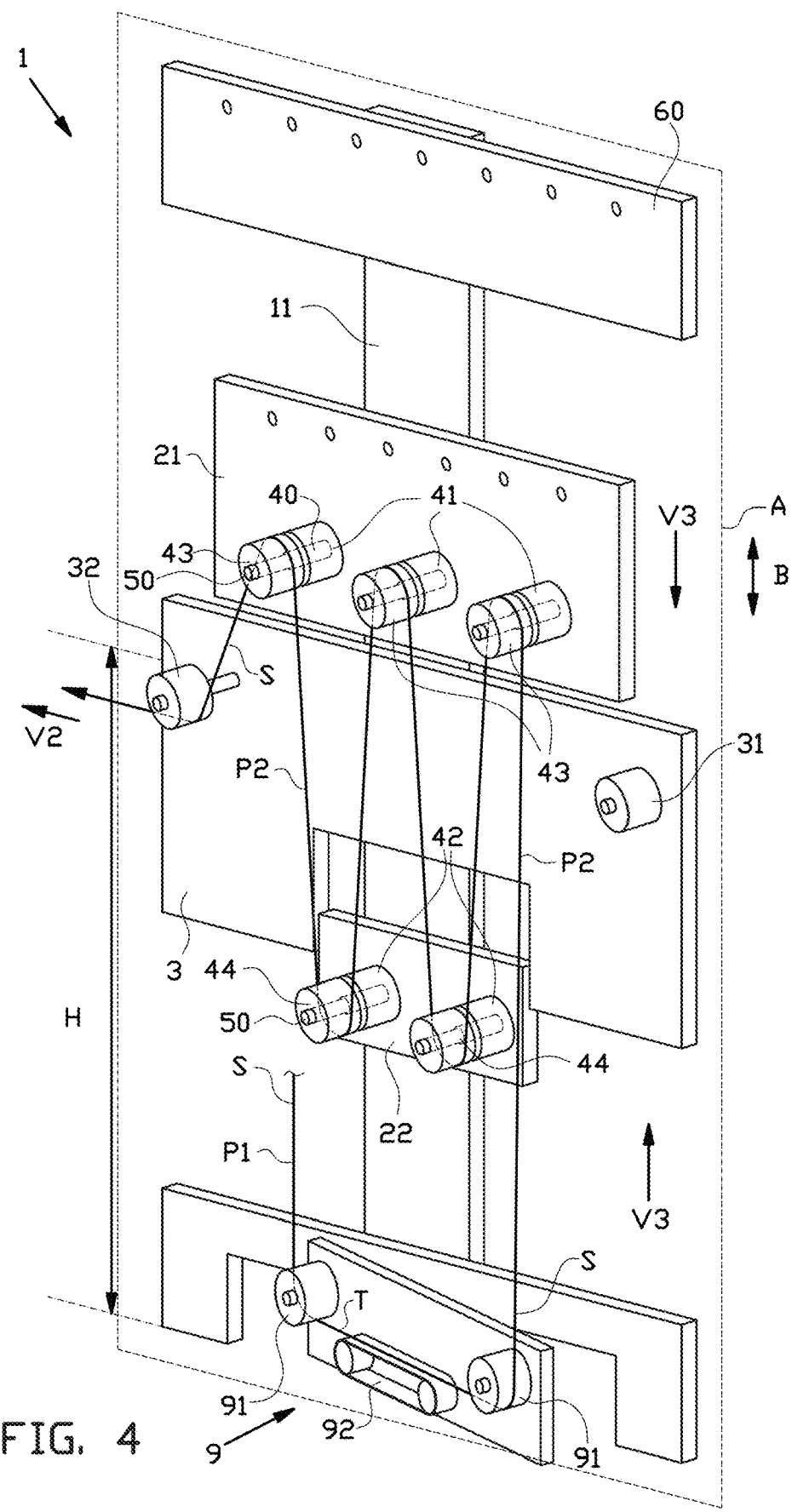

FIGS. 3 and 4 show the situation after the first holder 21 and the second holder 22 have been moved towards each other in the buffer direction B into a first loading position and a second loading position, respectively, as close as possible to, directly adjacent to and/or on opposite sides of the intermediate member 3. In said loading positions, the strip S can be conveniently guided along the first buffer path P1 and the second buffer path P2 at a height H that is ergonomic for an operator. In particular, the operator does not have to reach up and down over long distances to manually load the strip S into the festooner 1.

Figure 5:
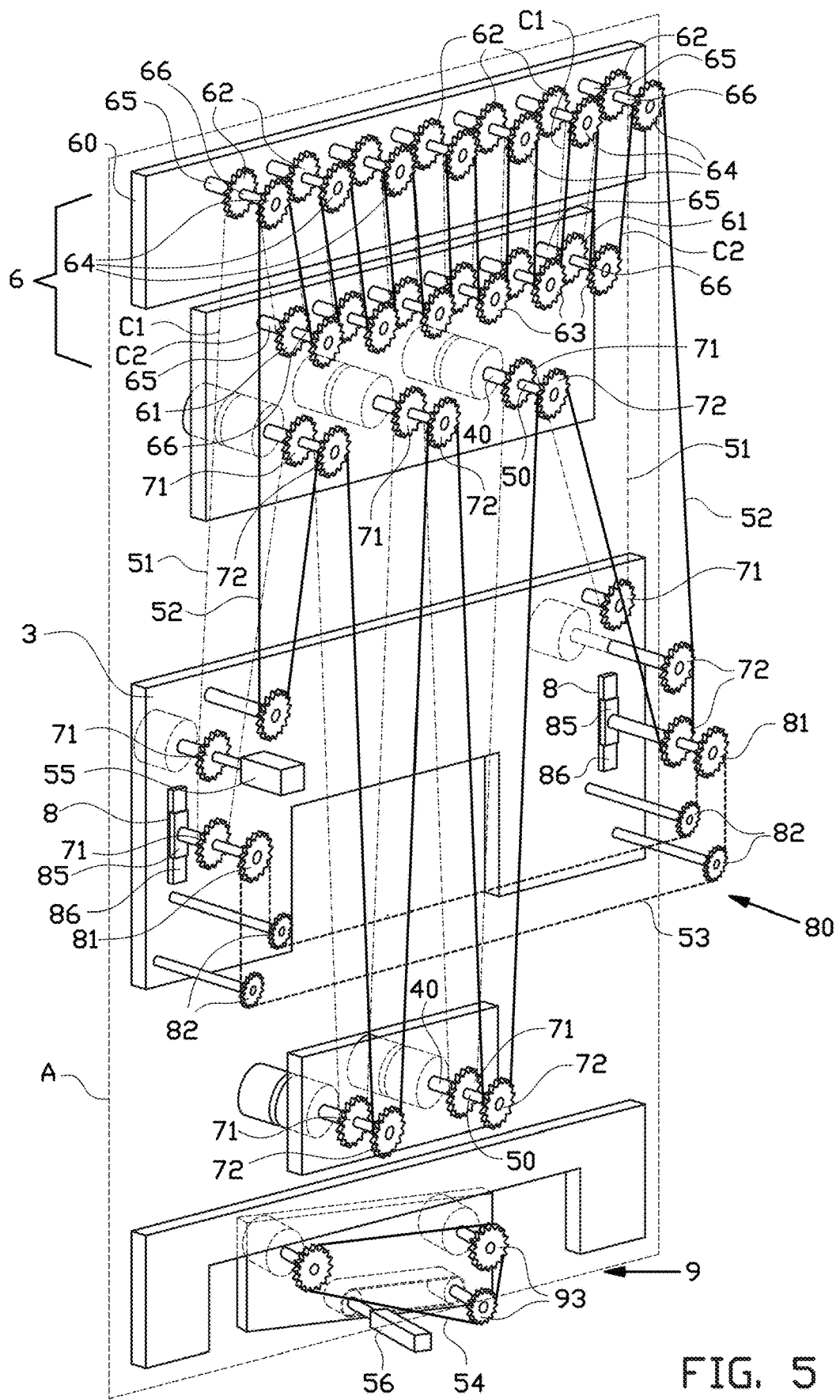
FIG. 5 shows an isometric view of a rear side of the festooner according to FIG. 1.

As shown in FIG. 5, the festooner 1 further comprises a first endless drive element 51 that extends at least partially alongside the first buffer path P1 to drive the first set of buffer rollers 41 and the second set of buffer rollers 42. In other words, the first drive element 51 extends in a loop and at least a part of said loop extends alongside the first buffer path P1. The first drive element 51 has a constant or substantially constant length. The first endless drive element 51 is schematically represented by a dashed line.

The festooner 1 is provided with one or more first drives 55 for causing the first endless drive element 51 to move at the same speed or substantially the same speed as the strip S, i.e. based on the speed of the strip S at the entry and/or exit of the first buffer path P1 and/or based on the extrusion speed of the extruder and/or based on the speed of the strip S at a downstream station, i.e. the cutter. Using more than one first drive 55 at different locations along the first buffer path P1 may reduce looseness of the first endless drive element 51 as a result of tolerance build-up. The first endless drive element 51 runs along the first buffer path P1 in the same direction as the strip S and ultimately departs from the first buffer path P1. The first endless drive element 51 is then returned to the start of the first buffer path P1 through another section of the festooner 1 to complete the loop.

In this exemplary embodiment, the first endless drive element 51 is a chain. Alternatively, a drive belt, timing belt or the like may be used. The festooner 1 comprises a first set of buffer wheels 71, in particular sprocket wheels, that engage with the first endless drive element 51 to be driven by said first endless drive element 51. Each buffer wheel of the first set of buffer wheels 71 is coaxially mounted to and/or rotatable together with a respective one of the buffer rollers of the first set of buffer rollers 41 and the second set of buffer roller 42 or one of the entry roller 31 and the exit roller 32. In particular, the first set of buffer wheels 71 is held coaxially with the first set of buffer rollers 41 and the second set of buffer rollers 42 on the plurality of first shafts 40.

When the first set of buffer wheels 71 is driven in rotation by the first endless drive element 51, the first set of buffer rollers 41, the second set of buffer rollers 42, the entry roller 31 and the exit roller 32 are rotated as well. The diameter of the first set of buffer wheels 71 is chosen so as to support the first endless drive element 51 at the same or substantially the same radius at which the strip S is supported on the first set of buffer rollers 41, the second set of buffer rollers 42, and the entry roller 31.

The festooner 1 further comprises a second endless drive element 52, similar to the first endless drive element 51, that extends at least partially alongside the second buffer path P2 to drive the third set of buffer rollers 43 and the fourth set of buffer rollers 44. The second endless drive element 52 runs along the second buffer path P2 in the same direction as the strip S and ultimately departs from the second buffer path P2. The second endless drive element 52 is then returned to the start of the second buffer path P2 through another section of the festooner 1 to complete the loop. The second endless drive element 52 is schematically represented by a solid line.

In this exemplary embodiment, the second endless drive element 52, like the first endless drive element 51, is a chain. Alternatively, a drive belt, timing belt or the like may be used. The festooner 1 comprises a second set of buffer wheels 72, in particular sprocket wheels, that engage with the second endless drive element 52 to be driven by said second endless drive element 52. Each buffer wheel of the second set of buffer wheels 72 is coaxially mounted to and/or rotatable together with a respective one of the buffer rollers of the third set of buffer rollers 43 and the fourth set of buffer roller 44 and the exit roller 32. In particular, the second set of buffer wheels 72 is held coaxially with the third set of buffer rollers 43 and the fourth set of buffer rollers 44 on the plurality of second shafts 50.

It can be observed by comparing FIGS. 1-4 with FIG. 5 that the first set of buffer rollers 41, the second set of buffer rollers 42, the third set of buffer rollers 43 and the fourth set of buffer rollers 44 are located at a first side of the festooner plane A, and wherein the first set of buffer wheels 71 and the second set of buffer wheels 72 are located at a second side of the festooner plane A, opposite to the first side. In particular, the plurality of first shafts 40 and the plurality of second shafts 50 extend through the respective holders 21, 22 to the other side of the festooner plane A. Each second shaft 50 extends through a respective one of the first shafts 40 and protrudes out of the respective first shaft 40 to carry the respective buffer wheel of the second set of buffer wheels 72 in a coaxial relationship to the respective buffer wheel of the first set of buffer wheels 71 on the respective first shaft 40.

As shown in FIG. 5, in this exemplary embodiment, the festooner 1 comprises a coupling member 80 for coupling the first endless drive element 51 to the second endless drive element 52. Alternatively, the second endless drive element 52 can be driven by its own, one or more dedicated drives (not shown), which can be electronically coupled to the one or more first drives 55, for example via a control unit, to run at the same speed or at slightly different speeds.

In this example, the coupling member 80 comprises a third endless drive element 53, preferably a chain, that engages onto two first coupling wheels 81, in particular sprocket wheels, that are coaxially coupled to one buffer wheel of the first set of buffer wheels 71 and one buffer wheel of the second set of buffer wheels 72 so as to rotate together with said respective buffer wheels 71, 72. The third endless drive element 53 is schematically represented by a dashed line. In this example, the first endless drive element 51 and the second endless drive element 52 are coupled in a 1:1 transmission ratio. Alternatively, a non-equal transmission ratio may be chosen, for example for stretching or compressing the strip S in the second buffer path P2.

In this exemplary embodiment, the coupling member 80 further comprises one or more second coupling wheels 82, preferably sprocket wheels, that guide the third endless drive element 53 along an U-shaped path.

The festooner 1 further comprises a tension balancer 8 for balancing tensioning between the first endless drive element 51 and the second endless drive element 52. In this example, the tension balancer 8 comprises a guide 85 for each endless drive element 51, 52. The guide 85 is movable in a direction with at least a component or a vector component in the buffer direction B. In particular, the guide 85 is movable over a rail 86 that is mounted to the intermediate member 3. One buffer wheel of the first set of buffer wheels 71 and the second set of buffer wheels 72 is mounted to said guide 85 to move with said guide 85 in the buffer direction B. Preferably, the coupling member 80 is coupled to each one of the guides 85, wherein at least a part of the weight of the coupling member 80 pulls down on the guides 85 in the buffer direction B.

As it may be difficult to drive the transfer conveyor 92 with the first endless drive element 51, because of its oblique orientation relative to the festooner plane A, a separate second drive 56 may be provided to control the speed of the transfer conveyor 92. The festooner 1 may further comprises a fourth endless drive element 54, preferably a chain, to couple the transfer conveyor 92 and the transfer rollers 91, so that they can all be driven by the same second drive 56. The fourth endless drive element 54 is schematically represented by a solid line.

The strip S enters the festooner 1, i.e. at the entry roller 31, with an entry speed V1 and exits the festooner 1, i.e. at the exit roller 32, with an exit speed V2. The buffer capacity of the festooner 1 can be changed by moving the first holder 21 and the second holder 22 oppositely in the buffer direction B. The speed at which the capacity changes is schematically shown with speed arrow V3 parallel to the buffer direction B. Because the first endless drive element 51 and the second endless drive element 52 travel along the first buffer path P1 and the second buffer path P2 of the strip S and more or less behaves in the same manner as the strip S, the speed at which each buffer roller of the sets of buffer rollers 41-44 is driven is equal or substantially equal to the speed of the strip S at the respective buffer roller. In other words, the first endless drive element 51 and the second endless drive element 52 will automatically cause each buffer roller of the sets of buffer rollers 41-44 to change its rotational speed in response to a change in capacity of the festooner 1. In particular, each buffer roller of the sets of buffer rollers 41-44 can be driven automatically at the right speed by the first endless drive element 51 and the second endless drive element 52 in response to a change in entry speed V1, exit speed V2, the capacity change speed V3 and the position of the respective buffer roller within the festooner 1.

FIGS. 1 and 2 show the festooner 1 at maximum capacity. FIGS. 3 and 4 show the same festooner 1 at minimum capacity. It will be appreciated that the length of the first buffer path P1 and the second buffer path P2 when the festooner 1 is at maximum capacity is considerably longer than the length of the first buffer path P1 and the second buffer path P2 when the festooner 1 is at minimum capacity. The length of the first endless drive element 51 and the second endless drive element 52 travelling along the first buffer path P1 and the second buffer path P2, respectively, is varied with the same amount, while the overall length of the first endless drive element 51 and the second endless drive elements 52 remains the same. At minimum capacity of the festooner 1, considerable overlengths of the first endless drive element 51 and the second endless drive element 52 needs to be temporarily collected. To this end, the festooner 1 is provided with an overlength collector 6 for collecting and paying out (or off-load) the overlengths of the first endless drive element 51 and the second endless drive element 52.

The overlength collector 6 according to the present invention is located in the buffer direction B at one side of the first buffer path P1 only. In this particular case, the overlength collector 6 is located in the buffer direction B at a side of the first set of buffer rollers 41 facing away from the second set of buffer rollers 42. In other words, the overlength collector 6 is located above the first buffer path P1, the first set of buffer rollers 41 and/or the first holder 21, i.e. at or near the top end of the festooner 1. This has the technical advantage that overlength is being collected at one end of the festooner 1 only. The resulting festooner 1 can be more compact and/or more ergonomic. In particular, when the overlength collector 6 is located at or near the top of the festooner 1, the part of the festooner 1 that buffers the strip S can be located closer to the ground surface. Conveniently, the previously mentioned height H of the intermediate member 3 above the ground surface can be obtained, so that—despite the presence of the overlength collector 6—the strip S can be loaded ergonomically into the festooner 1.

As shown in FIG. 5, the overlength collector 6 comprises a first set of collector wheels 61 and a second set of collector wheels 62 that define a meandering first collector path C1 between them. In other words, the first collector path C1 travels or extends alternatingly along a wheel of the first set of collector wheels 61 and a wheel of the second set of collector wheels 62. It will be clear that the first collector path C1 coincides or substantially coincides with the path travelled by the first endless drive element 51 through the overlength collector 6. More in particular, the first collector path C1, like the first buffer path P1, comprises a plurality of second line segments extending between the collector wheels of the first set of collector wheels 61 and the second set of collector wheels 62. The second line segments are bitangent to the pair of collector wheels it interconnects. More specifically, each second line segment extends as an outer tangent between a pair of collector wheels of the first set of collector wheels 61 and the second set of collector wheels 62.

Preferably, the first set of collector wheels 61 and the second set of collector wheels 62 are sprocket wheels that can engage with the first endless drive element 51 in the form of a chain.

The first set of collector wheels 61 is held by or mounted to the first holder 21. The overlength collector 6 further comprises a collector frame 60 that is arranged to remain stationary in the buffer direction B while the first holder 21 moves. Preferably, the collector frame 60 is mounted to the column 11 at or near the top end of the festooner 1. The second set of collector wheels 62 is mounted to said collector frame 60. The first set of collector wheels 61 and the second set of collector wheels 62 are mounted to the first holder 21 and the collector frame 60, respectively, via a plurality of third shafts 65. Like the first shafts 40, said third shafts 65 are hollow.

When the first holder 21 is moved in the buffer direction B, the first set of collector wheels 61 moves apart from or towards the second set of collector wheels 62. Hence, the length increase or decrease of the first endless drive element 51 in the overlength collector 6, i.e. in the first collector path C1, is defined by the relative movement between the first set of collector wheels 61 and the second set of collector wheels 62 in the buffer direction B. Said relative movement is generated by the movement of the first holder 21 in the buffer direction B. In contrast, the length increase or decrease of the first endless drive element 51 in the first buffer path P1 is defined by the opposite movements of the first holder 21 and the second holder 22 in the buffer direction B. Hence, the change in distance between the first holder 21 and the second holder 22 during their respective opposite movements is twice the change in distance between the first holder 21 and the collector frame 60.

To collect all of the overlength resulting from the festooner 1 being at minimum capacity, the number of collector wheels of the first set of collector wheels 61 is twice the number of buffer wheels of the first set of buffer wheels 71. Alternatively formulated, the number of second line segments is twice the number of first line segments. Consequently, when the first holder 21 is moved in the buffer direction B, the length of the first endless drive element 51 is increased or decreased over a number of second line segments that is twice the number of first line segments. This allows the first collector path C1 to collect an overlength of the first endless drive element 51 that is equal or substantially to the decrease of the length of the first endless drive element 51 extending along the first buffer path P1 when the festooner 1 is at minimum capacity, and conversely to pay out or off load an overlength equal or substantially equal to the increase of the length of the first endless drive element 51 extending along the first buffer path P1 when the festooner 1 moves towards maximum capacity. In other words, with only the movement of the first holder 21 in one direction of the buffer direction B, the first collector path C1 can be increased or decreased with the same amount that the first buffer path P1 is decreased or increased as a result of the opposite movement of both the first holder 21 and the second holder 22 in the buffer direction B.

The overlength collector 6 further comprises a third set of collector wheels 63 and a fourth set of collector wheels 64 that define a meandering second collector path C2 between them, similar to the first collector path C1. The second collector path C2 travels or extends alternatingly along a wheel of the third set of collector wheels 63 and a wheel of the fourth set of collector wheels 64. It will be clear that the second collector path C2 coincides or substantially coincides with the path travelled by the second endless drive element 52 through the overlength collector 6.

The third set of collector wheels 63 and the fourth set of collector wheels 64 are arranged in a coaxial relationship to the first set of collector wheels 61 and the second set of collector wheels 62, respectively, on a plurality of fourth shafts 66. The fourth shafts 66 extend concentrically within and/or extend through the third shafts 65. The second collector path C2 can thus be a copy of the first collector path C1, preferably extending parallel to each other.

The length of the second collector path C2 can be increased or decreased in the same way as and/or simultaneously with the length change of the first collector path C1. This allows the second collector path C2 to collect an overlength of the second endless drive element 52 that is equal or substantially to the decrease of the length of the second endless drive element 52 extending along the second buffer path P2 when the festooner 1 is at minimum capacity, and conversely to pay out or off load an overlength equal or substantially equal to the increase of the length of the second endless drive element 52 extending along the second buffer path P2 when the festooner 1 moves towards maximum capacity.

Figure 6:
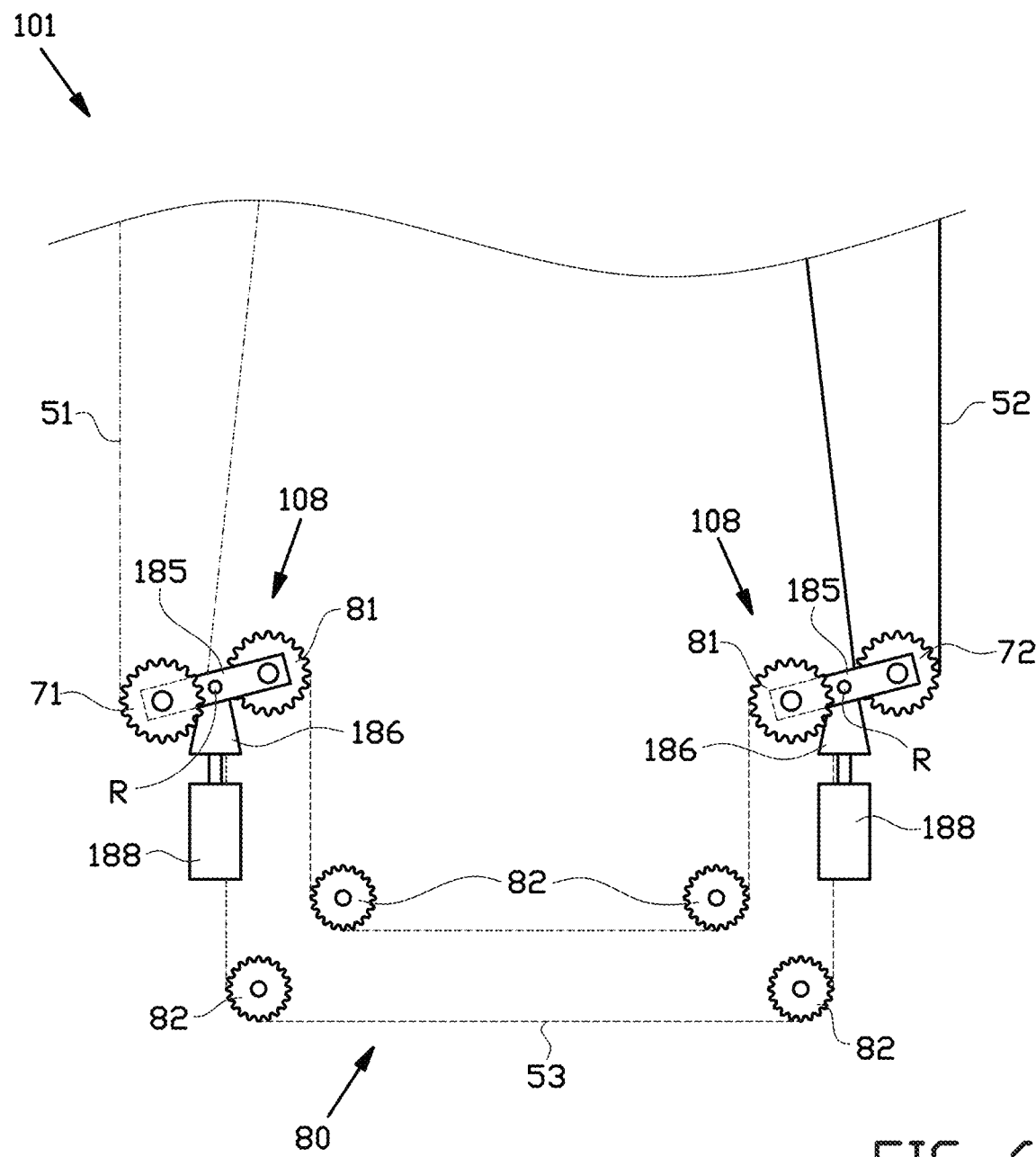
FIG. 6 shows a rear view of an alternative festooner according to a second exemplary embodiment of the invention.

FIG. 6 shows an alternative festooner 101 according to a second exemplary embodiment of the invention, which differs from the aforementioned festooner 1 only in that its balancer 108 has a rotatable guide 185 for each endless drive element 51, 52. Each guide 185 is movable like a seesaw about a rotation axis R and carries one buffer wheel 71, 72 from the respective set of buffer wheels and a first coupling wheel 81 on opposite sides of the rotation axis R. In this example, each guide 185 is support by a central hinge member 186 at the rotation axis R. The guides 185 are interconnected by the coupling member 80 in the form of the third endless drive element 53 that engages both first coupling wheels 81. The first endless drive element 51 engages with the guide 185 carrying the first buffer wheel 71 and the second endless drive element 52 engages with the guide 185 carrying the second buffer wheel 72. Consequently, when the guide 185 that is associated with the first endless drive element 51 is pulled upwards with a component in the buffer direction B as a result of tension in said first endless drive element 51, the seesaw movement of the first guide 185 is transmitted through the third endless drive element 53 to the other guide 185, which responds with a seesaw movement of its own to relieve tension in the second endless drive element 52 in an upward direction. As a result, the tension between the first endless drive element 51 and the second endless drive element 52 can be balanced out.

The alternative festooner 101 is further provided with one or more dampeners 188, for example a pneumatic cylinder or a spring, to dampen minor vibrations or fluctuations in the endless drive elements 51, 52. In this example, the one or more dampeners 188 are configured to support the respective guides 185. The one or more dampeners 188 may alternative be associated with one or more of the buffer wheels 71, 72. The one or more dampeners 188 may also be applied to the festooner 1 of the previous embodiment in a similar manner.

A method for buffering a strip S using the aforementioned festooners 1, 101 will now be briefly discussed with reference to FIGS. 1-6. In particular, the method comprises the steps of:
  guiding a strip S through the festooner 1 along the buffer path P1;
  transferring the strip S from the first buffer path P1 to the second buffer path P2;
  guiding the strip S through the second buffer path P2;
  driving each buffer roller of the first set of buffer rollers 41 and the second set of buffer rollers 42 with the first endless drive element 51; and
  driving each buffer roller of the third set of buffer rollers 43 and the fourth set of buffer rollers 44 with the second endless drive element 52.

During the aforementioned steps, the method may further comprise the steps of:
  varying the buffer capacity of the festooner 1 by moving at least one of the first holder 21 and the second holder 22 towards and/or away from the other of the first holder 21 and the second holder 22. In the buffer direction B; and
  collecting and/or paying out overlengths of the first endless drive element 51 and the second endless drive element 52 with an overlength collector 6 in response to varying the buffer capacity.

For the initial guiding of the strip S through the festooner 1 along the first buffer path P1 and the second buffer path P2, the first holder 21 and the second holder 22 can be moved in the buffer direction B towards each other into a first loading position and a second loading position, respectively, as shown in FIGS. 3 and 4. The strip S can subsequently be manually guided through the festooner 1 along the first buffer path P1 and the second buffer path P2, while the first holder 21 and the second holder 22 are conveniently located at an ergonomic working height in close proximity to, i.e. directly above and below, the intermediate member 3.

The previously discussed festooner 1 has the benefit that speed differences between the strip S and the festooner 1, and as a result thereof tensile forces in the strip S, can be reduced to a minimum. In particular, the forces exerted on the strip S can be reduced or prevented to such an extent that the strip S can be guided through the festooner 1 without a liner, i.e. in direct contact with the rollers of the festooner 1. This is particularly relevant for thin or hot strips, such as gum strips used in tire building, because said strips can be easily deformed. Without a liner, the buffering process is less costly and more durable, because there is less waste.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary the invention relates to a festooner 1 and a method for buffering a strip S, the festooner 1 comprising a first set of buffer rollers 41 and a second set of buffer rollers 42, wherein the first set of buffer rollers 41 and the second set of buffer rollers 42 define a meandering first buffer path P1 between them, wherein the festooner 1 further comprises a first endless drive element 51 for driving the first set of buffer rollers 41 and the second set of buffer rollers 42, wherein the festooner 1 further comprises a third set of buffer rollers 43 and a fourth set of buffer rollers 44 coaxial to the first set of buffer rollers 41 and the second set of buffer rollers 42, respectively, defining a meandering second buffer path P2 between them, wherein the festooner 1 further comprises a second endless drive element 52 for driving the third set of buffer rollers 43 and the fourth set of buffer rollers 44.

LIST OF REFERENCE NUMERALS

1 festooner
11 column
21 first holder
22 second holder
3 intermediate member
31 entry roller
32 exit roller
40 first shaft
41 first set of buffer rollers
42 second set of buffer rollers
43 third set of buffer rollers
44 fourth set of buffer rollers
50 second shaft
51 first endless drive element
52 second endless drive element
53 third endless drive element
54 fourth endless drive element
55 first drive
56 second drive
6 overlength collector
60 collector frame
61 first set of collector wheels
62 second set of collector wheels
63 second set of collector wheels
64 second set of collector wheels
65 third shaft
66 fourth shaft
71 first set of buffer wheels
72 second set of buffer wheels
8 tension balancer
80 coupling member
81 first coupling wheel
82 second coupling wheel
85 guide
86 rail
9 transfer member
91 transfer roller
92 transfer conveyor
101 alternative festooner
108 tension balancer
185 guide
186 hinge member
188 dampener
A festooner plane
B buffer direction
C1 first collector path
C2 second collector path
H height
P1 first buffer path
P2 second buffer path
S strip
T transfer path

The invention claimed is:

1. A festooner for buffering a strip, wherein the festooner comprises a first holder and a second holder, wherein at least one of the first holder and the second holder is movable towards and away from the other of the first holder and the second holder in a buffer direction to vary a buffer capacity of the festooner, wherein the festooner further comprises a first set of buffer rollers and a second set of buffer rollers held by the first holder and the second holder, respectively, wherein the first set of buffer rollers and the second set of buffer rollers define a meandering first buffer path between them extending alternatingly along a buffer roller of the first set of buffer rollers and a buffer roller of the second set of buffer rollers, wherein the festooner further comprises a first endless drive element for driving the first set of buffer rollers and the second set of buffer rollers, wherein the festooner further comprises a third set of buffer rollers and a fourth set of buffer rollers coaxial to the first set of buffer rollers and the second set of buffer rollers, respectively, defining a meandering second buffer path between them extending alternatingly along a buffer roller of the third set of buffer rollers and a buffer roller of the fourth set of buffer rollers, wherein the festooner further comprises a second endless drive element for driving the third set of buffer rollers and the fourth set of buffer rollers.

2. The festooner according to claim 1, wherein the festooner comprises a plurality of first shafts for mounting the first set of buffer rollers and the second set of buffer rollers, wherein the festooner further comprises a plurality of second shafts for mounting the third set of buffer rollers and the fourth set of buffer rollers, wherein the plurality of first shafts are hollow and wherein each second shaft of the plurality of second shafts extends concentrically through a respective first shaft of the plurality of first shafts.

3. The festooner according to claim 2, wherein the festooner comprises a first set of buffer wheels and a second set of buffer wheels which are coupled to the plurality of first shafts and the plurality of second shafts, respectively, wherein the first endless drive element is arranged for engaging onto the first set of buffer wheels and the second endless drive element is arranged for engaging onto the second set of buffer wheels.

4. The festooner according to claim 3, wherein the first holder and the second holder extend in a festooner plane parallel to the buffer direction, wherein the first set of buffer rollers, the second set of buffer rollers, the third set of buffer rollers and the fourth set of buffer rollers are located at a first side of the festooner plane, and wherein the first set of buffer wheels and the second set of buffer wheels are located at a second side of the festooner plane, opposite to the first side.

5. The festooner according to claim 1, wherein the festooner comprises a first drive for driving one of the first endless drive element and the second endless drive element and a coupling member for coupling the first endless drive element to the second endless drive element.

6. The festooner according to claim 5, wherein the coupling member comprises a third endless drive element.

7. The festooner according to claim 1, wherein the festooner further comprises a tension balancer for balancing tensioning between the first endless drive element and the second endless drive element.

8. The festooner according to claim 7, wherein the festooner comprises a plurality of first shafts for mounting the first set of buffer rollers and the second set of buffer rollers, wherein the festooner further comprises a plurality of second shafts for mounting the third set of buffer rollers and the fourth set of buffer rollers, wherein the plurality of first shafts are hollow and wherein each second shaft of the plurality of second shafts extends concentrically through a respective first shaft of the plurality of first shafts, wherein the festooner comprises a first set of buffer wheels and a second set of buffer wheels which are coupled to the plurality of first shafts and the plurality of second shafts, respectively, wherein the first endless drive element is arranged for engaging onto the first set of buffer wheels and the second endless drive element is arranged for engaging onto the second set of buffer wheels, wherein the tension balancer comprises one or more guides that are movable in a direction with at least a vector component in the buffer direction, wherein at least one buffer wheel of the first set of buffer wheels or the second set of buffer wheels is mounted to said one or more guides to move with said one or more guides in the buffer direction.

9. The festooner according to claim 8, wherein the festooner comprises a first drive for driving one of the first endless drive element and the second endless drive element and a coupling member for coupling the first endless drive element to the second endless drive element, wherein the coupling member comprises a third endless drive element, wherein the coupling member is coupled to the one or more guides, wherein at least a part of the weight of the coupling member pulls down on the one or more guides in the buffer direction.

10. The festooner according to claim 1, wherein the festooner further comprises one or more dampeners for dampening the first endless drive element or the second endless drive element.

11. The festooner according to claim 1, wherein the first holder and the second holder extend in a festooner plane parallel to the buffer direction, wherein the festooner further comprises a transfer member for transferring the strip from the first buffer path to the second buffer path along a transfer path extending obliquely to the festooner plane.

12. The festooner according to claim 11, wherein the transfer member comprises a set of transfer rollers for receiving the strip from the first buffer path and for outputting the strip into the second buffer path, wherein the set of transfer rollers are positioned obliquely with respect to the festooner plane.

13. The festooner according to claim 11, wherein the festooner comprises a transfer conveyor extending obliquely to the festooner plane.

14. The festooner according to claim 13, wherein the transfer conveyor comprises an endless belt.

15. The festooner according to claim 13, wherein the festooner comprises a second drive for driving the transfer conveyor.

16. The festooner according to claim 1, wherein the first buffer path and the second buffer path are parallel.

17. The festooner according to claim 1, wherein the first endless drive element and the second endless drive element are chains.

18. The festooner according to claim 1, wherein the first holder and the second holder are oppositely movable in the buffer direction to vary the buffer capacity of the festooner.

19. The festooner according to claim 1, wherein the festooner further comprises an overlength collector for collecting and paying out overlengths of the first endless drive element and the second endless drive element as a result of a variation in the buffer capacity of the festooner.

20. The festooner according to claim 19, wherein the overlength collector is located in the buffer direction at one side of the first buffer path only.

21. The festooner according to claim 19, wherein the overlength collector is located in the buffer direction at a side of the first set of buffer rollers facing away from the second set of buffer rollers.

22. The festooner according to claim 19, wherein the first set of buffer rollers is located above the second set of buffer rollers, wherein the overlength collector is located above the first set of buffer rollers.

23. The festooner according to claim 19, wherein the overlength collector comprises a first set of collector wheels and a second set of collector wheels that define a meandering first collector path between them extending alternatingly along a wheel of the first set of collector wheels and a wheel of the second set of collector wheels, wherein the first endless drive element extends along the first collector path.

24. The festooner according to claim 23, wherein the overlength collector comprises a third set of collector wheels and a fourth set of collector wheels that define a meandering second collector path between them extending alternatingly along a collector wheel of the third set of collector wheels and a collector wheel of the fourth set of collector wheels, wherein the second endless drive element extends along the second collector path.

25. The festooner according to claim 24, wherein the festooner comprises a plurality of third shafts for mounting the first set of collector wheels and the second set of collector wheels, wherein the festooner further comprises a plurality of fourth shafts for mounting the third set of collector wheels and the fourth set of collector wheels, wherein the plurality of third shafts are hollow and wherein each fourth shaft of the plurality of fourth shafts extends concentrically through a respective third shaft of the plurality of third shafts.

26. The festooner according to claim 24, wherein the first collector path and the second collector path are parallel.

27. A method for buffering a strip using a festooner according to claim 1, wherein the method comprises the steps of:
  guiding a strip through the festooner along the first buffer path;
  transferring the strip from the first buffer path to the second buffer path;
  guiding the strip through the second buffer path;
  driving the first set of buffer rollers and the second set of buffer rollers with the first endless drive element; and
  driving the third set of buffer rollers and the fourth set of buffer rollers with the second endless drive element.

28. The method according to claim 27, wherein the method further comprises the steps of:
  varying the buffer capacity of the festooner by moving at least one of the first holder and the second holder towards or away from the other of the first holder and the second holder in the buffer direction; and
  collecting or paying out overlengths of the first endless drive element and the second endless drive element with an overlength collector in response to varying the buffer capacity.

29. The method according to claim 27, wherein the strip is guided through the festooner without using a support layer for supporting said strip relative to the buffer rollers.

* * * * *